United States Patent [19]

Kim

[11] Patent Number: 5,486,842
[45] Date of Patent: Jan. 23, 1996

[54] ON-SCREEN DISPLAY CIRCUIT OF THE INTERLACED SCANNING TYPE

[75] Inventor: Ho H. Kim, Daeku, Rep. of Korea

[73] Assignee: Goldstar Electron Co., Ltd., Choongchungbook-do, Rep. of Korea

[21] Appl. No.: 368,960

[22] Filed: Jan. 5, 1995

[30] Foreign Application Priority Data

Jan. 7, 1994 [KR] Rep. of Korea .................. 212/1994

[51] Int. Cl.⁶ .................................................. G09G 1/16
[52] U.S. Cl. ............................................................ 345/26
[58] Field of Search ................................ 345/25, 26, 141; 348/465, 589, 600

[56] References Cited

U.S. PATENT DOCUMENTS

| | | | |
|---|---|---|---|
| 4,095,216 | 6/1978 | Spicer | 345/25 |
| 4,476,464 | 10/1984 | Hobbs | 345/26 |

FOREIGN PATENT DOCUMENTS

| | | | |
|---|---|---|---|
| 999661 | 11/1976 | Canada | 345/141 |
| 55-10610 | 1/1980 | Japan | 345/25 |

*Primary Examiner*—Jeffery Brier

[57] ABSTRACT

An on-screen display circuit of the interlaced scanning type comprising a vertical counter for counting a horizontal synchronous signal inputted thereto and outputting the counted values as higher-order bits of a vertical address, a 1-bit counter for counting a vertical synchronous signal inputted thereto by one bit and outputting the counted value as a least significant bit of the vertical address, a vertical decoder for decoding output signals from the vertical counter and the 1-bit counter to designate a decoded vertical address, a character decoder for decoding a character address inputted thereto to designate a decoded horizontal address, and a font read only memory for outputting font data in its location corresponding to the decoded vertical address from the vertical decoder and the decoded horizontal address from the character decoder. The vertical decoder designates the vertical address of the font read only memory in response to the least significant bit from the 1-bit counter which is the counted value of the vertical synchronous signal, so that the font data from the font read only memory can be displayed on a screen in an interlaced scanning manner, being divided into odd and even fields of a video signal. Therefore, the present invention has the effect of doubling a resolution.

2 Claims, 3 Drawing Sheets

ON-SCREEN DISPLAY CIRCUIT OF THE INTERLACED SCANNING TYPE

BACKGROUND OF THE INVENTION

1. Field of the Invention

The present invention relates in general to on-screen display circuits, and more particularly to an on-screen display circuit of the interlaced scanning type for displaying a character or picture on a screen in an interlaced scanning manner to double a definition degree.

2. Description of the Prior Art

Generally, an on-screen display (referred to hereinafter as OSD) function is to display a desired character or picture on a desired position of a screen. Referring to FIG. 1, there is shown a block diagram of a conventional OSD circuit performing the OSD function. As shown in this drawing, the conventional OSD circuit comprises a vertical counter 1 for counting a horizontal synchronous signal H-SYNC inputted thereto, a vertical decoder 2 for decoding an output signal from the vertical counter 1 and outputting the decoded signal to designate a decoded vertical address, a character decoder 3 for decoding a character address inputted thereto and outputting the decoded signal to designate a decoded horizontal address, and a font read only memory (referred to hereinafter as ROM) 4 for storing information regarding characters or pictures to be displayed on the screen and outputting font data in its location corresponding to the decoded vertical address from the vertical decoder 2 and the decoded horizontal address from the character decoder 3.

The operation of the conventional OSD circuit with the above-mentioned construction will hereinafter be described.

First, the horizontal synchronous signal H-SYNC is separated from a broadcasting signal and then applied to the vertical counter 1. Upon inputting the horizontal synchronous signal H-SYNC, the vertical counter 1 counts the inputted horizontal synchronous signal H-SYNC and, as a result of the counting operation, outputs the vertical address to the vertical decoder 2, the vertical address designating a vertical dot of a font to be displayed on the screen. The vertical decoder 2 decodes the vertical address from the vertical counter 1 and outputs the decoded signal to the font ROM 4 to designate the decoded vertical address thereof. On the other hand, upon inputting the character address, the character decoder 3 decodes the inputted character address and outputs the decoded signal to the font ROM 4 to designate the decoded horizontal address thereof. As a result, the font ROM 4 outputs the font data in its location corresponding to the decoded vertical address from the vertical decoder 2 and the decoded horizontal address from the character decoder 3.

In the above-mentioned conventional OSD circuit, the decoded vertical decoder 2 is adapted to designate the vertical address of the font to be displayed on the screen using merely the counted value of the horizontal synchronous signal H-SYNC with no consideration for an interlaced scanning manner. For this reason, in the case where the addresses of the font are designated as shown in FIG. 2A, the same character or picture is displayed in both odd and even fields of a video signal as shown in FIG. 2B. In this connection, the above-mentioned conventional OSD circuit has a disadvantage in that the same dot data is displayed in both the odd and even fields of the video signal, resulting in a reduction in a resolution by half.

SUMMARY OF THE INVENTION

Therefore, the present invention has been made in view of the above problem, and it is an object of the present invention to provide an OSD circuit of the interlaced scanning type for outputting dot data of a character or picture to be displayed on a screen in an interlaced scanning manner to enhance a resolution of the displayed character or picture.

In accordance with the present invention, the above and other objects can be accomplished by a provision of an on-screen display circuit of the interlaced scanning type comprising a vertical counter for counting a horizontal synchronous signal inputted thereto and outputting the counted values as higher-order bits of a vertical address; a 1-bit counter for counting a vertical synchronous signal inputted thereto by one bit and outputting the counted value as a least significant bit of the vertical address; a vertical decoder for decoding output signals from said vertical counter and said 1-bit counter to designate a decoded vertical address; a character decoder for decoding a character address inputted thereto to designate a decoded horizontal address; and a font read only memory for outputting font data in its location corresponding to the decoded vertical address from said vertical decoder and the decoded horizontal address from said character decoder.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
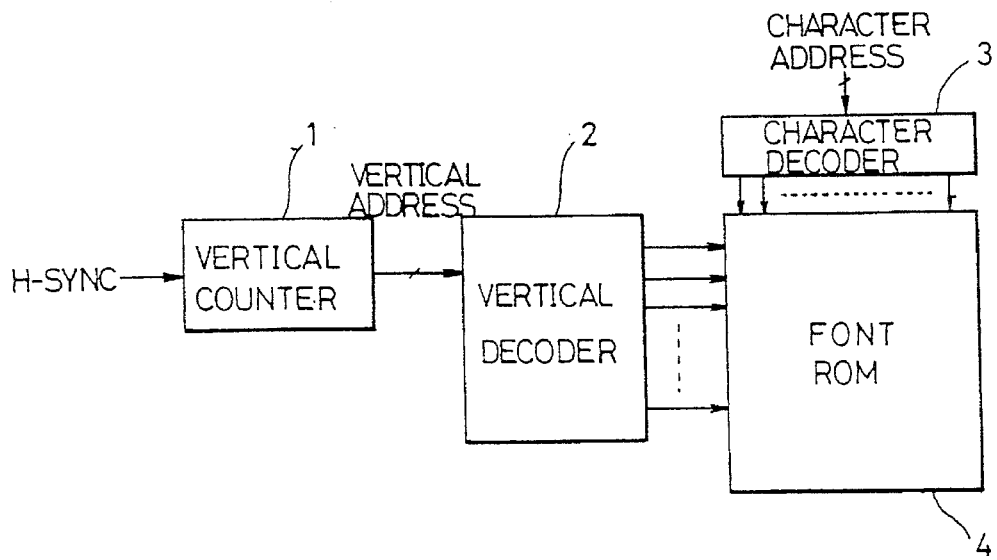
FIG. 1 is a block diagram of a conventional OSD circuit.
Figure 3:
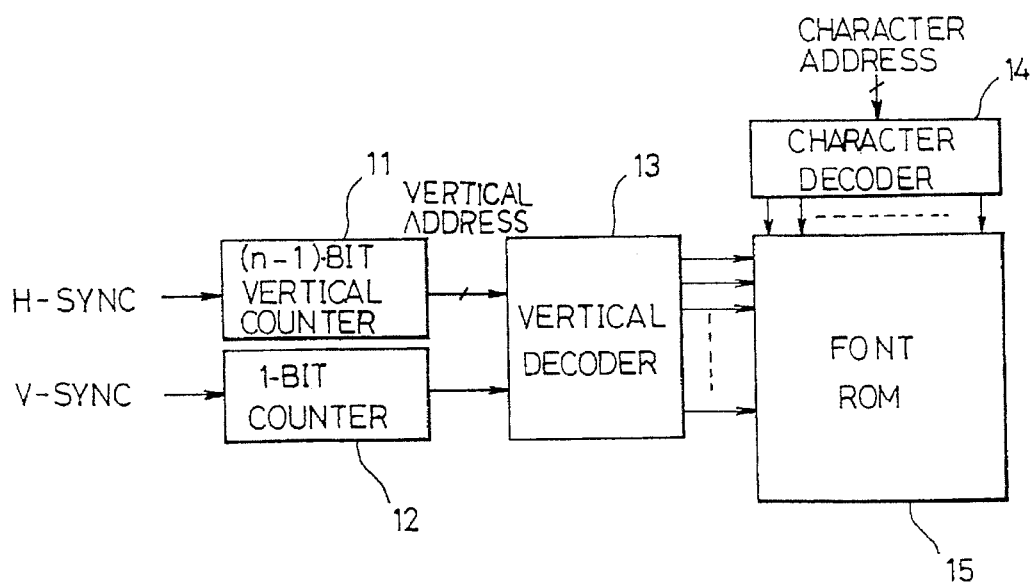
FIG. 3 is a block diagram of an OSD circuit of the interlaced scanning type in accordance with the present invention.
Figure 2A:
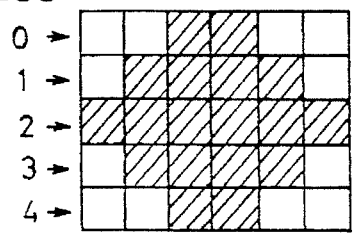
FIGS. 2A and 2B are views illustrating states of a font displayed on a screen by the conventional OSD circuit in FIG. 1.
Figure 2B:
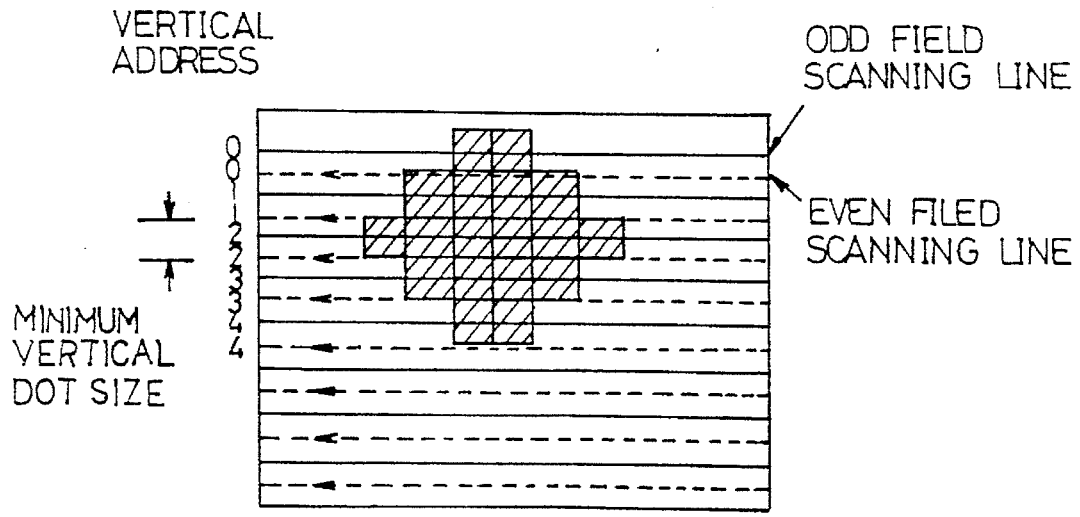

Referring to FIG. 3, there is shown a block diagram of an OSD circuit of the interlaced scanning type in accordance with the present invention. As shown in this drawing, the OSD circuit of the interlaced scanning type comprises an (n-1)-bit vertical counter 11 for counting a horizontal synchronous signal H-SYNC inputted thereto and outputting the counted values as n-1 higher-order bits of a vertical address, a 1-bit counter 12 for counting a vertical synchronous signal V-SYNC inputted thereto by one bit and outputting the counted value as a least significant bit of the vertical address, a vertical decoder 13 for decoding output signals from the (n-1)-bit vertical counter 11 and the 1-bit counter 12 and outputting the decoded signal to a font ROM 15 to designate the decoded vertical address thereof, and a character decoder 14 for decoding a character address inputted thereto and outputting the decoded signal to the font ROM 15 to designate a decoded horizontal address thereof.

The font ROM 15 is adapted to store information regarding characters or pictures to be displayed on a screen and to output font data in its location corresponding to the decoded vertical address from the vertical decoder 13 and the decoded horizontal address from the character decoder 14 so that it can be displayed on the screen in an interlaced scanning manner, being divided into odd and even fields of a video signal.

The operation of the OSD circuit of the interlaced scanning type with the above-mentioned construction in accordance with the present invention will hereinafter be described in detail.

First, the horizontal synchronous signal H-SYNC is separated from a broadcasting signal and then applied to the (n-1)-bit vertical counter 11. Upon inputting the horizontal synchronous signal H-SYNC, the (n-1)-bit vertical counter 11 counts the inputted horizontal synchronous signal H-SYNC and outputs the counted values as the n-1 higher-order bits of the vertical address to the vertical decoder 13. Also, the vertical synchronous signal V-SYNC is separated from the broadcasting signal and then applied to the 1-bit counter 12. Upon inputting the vertical synchronous signal V-SYNC, the 1-bit counter 12 counts the inputted vertical synchronous signal V-SYNC and outputs the counted value as the least significant bit of the vertical address to the vertical decoder 13. The vertical decoder 13 takes the output signal from the 1-bit counter 12 as the least significant bit of the vertical address and the output signals from the (n-1)-bit vertical counter 11 as the remaining higher-order bits of the vertical address. Then, the vertical decoder 13 decodes the n-bit vertical address and outputs the decoded signal to the font ROM 15 to designate the decoded vertical address thereof.

Therefore, because the vertical decoder 13 designates the vertical address of the font ROM 15 according to the n-1 higher-order bits from the (n-1)-bit vertical counter 11 and the least significant bit from the 1-bit counter 12 which is the counted value of the vertical synchronous signal V-SYNC, the font data of the character or picture can be displayed on an screen in the interlaced scanning manner, being divided into odd and even fields of the video signal.

Figure 4A:
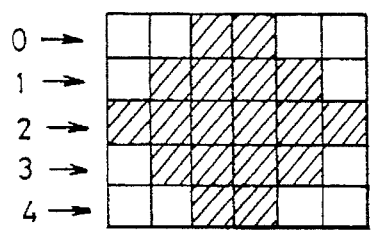
FIGS. 4A and 4B are views illustrating states of the font displayed on the screen by the present OSD circuit in FIG. 3.
Figure 4B:
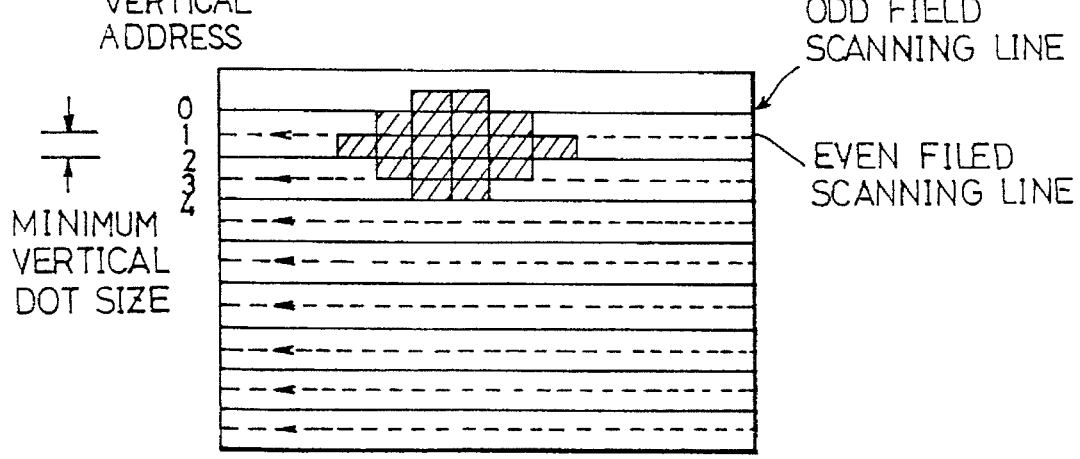

On the other hand, upon inputting the character address, the character decoder 14 decodes the inputted character address and outputs the decoded signal to the font ROM 15 to designate the decoded horizontal address thereof. As a result, the font ROM 15 outputs the font data in its location corresponding to the decoded vertical address from the vertical decoder 13 and the decoded horizontal address from the character decoder 14. At this time, the font data from the font ROM 15 is outputted being divided into the odd and even fields of the video signal. As a result, in the case where the addresses of the font are designated as shown in FIG. 4A, the character or picture is displayed on the screen in an interlaced scanning manner as shown in FIG. 4B.

As apparent from the above description, according to the present invention, the OSD circuit of the interlaced scanning type outputs the information to be displayed in the interlaced scanning manner, so that a size of the vertical dots displayed on the screen can be reduced by half as compared with that of the conventional OSD circuit. Therefore, the OSD circuit of the interlaced scanning type of the present invention has the effect of doubling the resolution as compared with the conventional OSD circuit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An on-screen display circuit of the interlaced scanning type comprising:

a vertical counter for counting a horizontal synchronous signal inputted thereto and outputting the counted values as higher-order bits of a vertical address;

a 1-bit counter for counting a vertical synchronous signal inputted thereto by one bit and outputting the counted value as a least significant bit of the vertical address;

a vertical decoder for decoding output signals from said vertical counter and said 1-bit counter to designate a decoded vertical address;

a character decoder for decoding a character address inputted thereto to designate a decoded horizontal address; and a font read only memory for outputting font data in its location corresponding to the-decoded vertical address from said vertical decoder and the decoded horizontal address from said character decoder.

2. An on-screen display circuit of the interlaced scanning type as set forth in claim 1, wherein said vertical decoder is adapted to designate the decoded vertical address of said font read only memory in response to the least significant bit from said 1-bit counter, said least significant bit being the counted value of the vertical synchronous signal, so that the font data from said font read only memory can be displayed on a screen in an interlaced scanning manner divided into odd and even fields of a video signal.

* * * * *